United States Patent [19]
Abler

[11] Patent Number: 5,711,976
[45] Date of Patent: Jan. 27, 1998

[54] CHEESE MOLDING APPARATUS

[75] Inventor: Joseph H. Abler, Brookfield, Wis.

[73] Assignee: Stainless Steel Fabricating, Inc., Columbus, Wis.

[21] Appl. No.: 651,600

[22] Filed: May 22, 1996

[51] Int. Cl.⁶ .............................. A01J 25/00; A23C 19/00
[52] U.S. Cl. .............................. 426/36; 99/452; 99/455; 99/466; 99/484; 425/259; 425/438; 425/444; 426/231; 426/582
[58] Field of Search ................... 99/452–455, 484, 99/460–466, 459, 458, 485–487, 468; 425/438, 259, 261, 444, 434, 441, 84, 308–310, 412, 376.1; 426/36, 231–233, 582; 264/109, 29.7, 334

[56] References Cited

U.S. PATENT DOCUMENTS

| | | | |
|---|---|---|---|
| 2,370,920 | 3/1945 | Schaub | 99/455 |
| 2,899,317 | 8/1959 | Hensgen | 99/455 |
| 3,242,571 | 3/1966 | Langford | 99/456 X |
| 3,295,205 | 1/1967 | Sjoholm | 99/466 |
| 3,805,689 | 4/1974 | Berger | 99/484 |
| 4,112,835 | 9/1978 | Mongiello | 99/455 |
| 4,117,647 | 10/1978 | Rossi | 53/502 |
| 4,248,578 | 2/1981 | Worden | 425/220 |
| 4,463,844 | 8/1984 | Huffman et al. | 194/4 |
| 4,541,329 | 9/1985 | Mongiello | 426/36 |
| 4,608,921 | 9/1986 | Mongiello, Sr. | 99/455 |
| 4,613,294 | 9/1986 | Rose et al. | 425/438 |
| 4,738,863 | 4/1988 | Lindgren, Sr. et al. | 426/582 |
| 4,820,540 | 4/1989 | Budahn | 426/582 |
| 4,850,837 | 7/1989 | Lindgren, Sr. et al. | 425/308 X |
| 4,936,200 | 6/1990 | Buhler et al. | 99/353 |
| 5,011,641 | 4/1991 | Buhler et al. | 264/109 |

*Primary Examiner*—Timothy F. Simone
*Attorney, Agent, or Firm*—Quarles & Brady

[57] ABSTRACT

A molds is filled with cheese by an apparatus that includes an extruder which injects cheese through the opening in the mold. A plunger is located adjacent to the mold and is contacted by moveable wall of the mold as cheese fills a mold cavity. An actuator may be provided to varying the position of the plunger in order to accommodate different size molds. A sensor coupled to the plunger measures the force exerted by the cheese against the moveable wall. Aa controller receives a force signal from the sensor and produces an output signal when the force reaches a predetermined level. The output signal activates a knife blade which cuts off further injection of cheese into the mold cavity.

14 Claims, 6 Drawing Sheets

CHEESE MOLDING APPARATUS

BACKGROUND OF THE INVENTION

The field of this invention is cheese processing methods and machinery; and more particularly, methods for molding mozzarella cheese into shaped products.

In cheese processing machinery such as that described in U.S. Pat. No. 4,112,835, heated cheese is transferred from a cooker to a molder/chiller. The highly viscous cheese is conveyed by an auger to a chamber located beneath a conveyor or rotating platform carrying molds. As the empty molds pass over this chamber, heated cheese is forced up into the molds through openings to fill them with the proper amount of cheese. The viscous cheese takes on the shape of the mold which is conveyed through a chiller to cool the cheese. The cooled cheese is ejected from the molds as they leave the chiller to form the shaped cheese product.

The weight of the cheese product is determined by the amount of cheese forced into each mold, because the molds are fastened to the conveyor, the full mold cannot be weighed. Thus an indirect method must be used to ensure that the mold contains the proper weight of cheese. Several methods have been employed to measure indirectly the amount of cheese injected into the molds and these have been satisfactory as long as there is a liberal tolerance on the specified product weight. For example, a mold cap may be lifted by the cheese as it fills the mold, and the mold cap operates a switch when it reaches a preselected height. The switch initiates an action which terminates filling of the mold, such as operating a knife blade that acts as a gate by closing off the entrance to the mold. Product weight is adjusted by changing the height of the switch.

Where stringent weight requirements are placed on the cheese product, prior indirect measurement methods are inadequate. For example, for a 2300 gram cheese product the weight might vary by as much as ±50 grams or more, whereas the specifications may allow a deviation of only ±5–10 grams in the final product. Better control of the product weight is thus required, and this must be achieved with economically realizable machinery that will comply with requirements of government agencies such as the United States Food and Drug Administration.

SUMMARY OF INVENTION

The present invention is a method and apparatus for precisely controlling the weight of molded cheese products. More specifically, the method includes filling a mold with cheese through one end of the mold cavity, placing an adjustable wall at the other end of the mold cavity which blocks the flow of cheese when the level reaches a preselected height in the mold; measuring the force applied to the adjustable wall by the cheese in the mold; and terminating filling of the mold with cheese when the force reaches a preselected amount.

A general object is to consistently produce a molded cheese product of the specified weight. The adjustable wall is set so that the desired amount of cheese fills the mold cavity. Consistency is achieved by filling the mold cavity until a preselected force is achieved. This force is selected high enough that air pockets are squeezed out and filled with cheese, but the force is not so great as to drive water out of the cheese.

Another object of the invention is to facilitate adjustment of the molding process to form products of the desired weight. The adjustable wall is associated with a mold filling control system which enables the product weight to be changed by commands thereto. An operator may periodically weigh the cheese product manually and input an appropriate command to the position control system. In the alternative, the commands may be produced by an automatic weighing system that measures actual product weight, compares actual weight to specified weight and issues a command based on the difference.

DETAILED DESCRIPTION OF THE INVENTION

Figure 1:
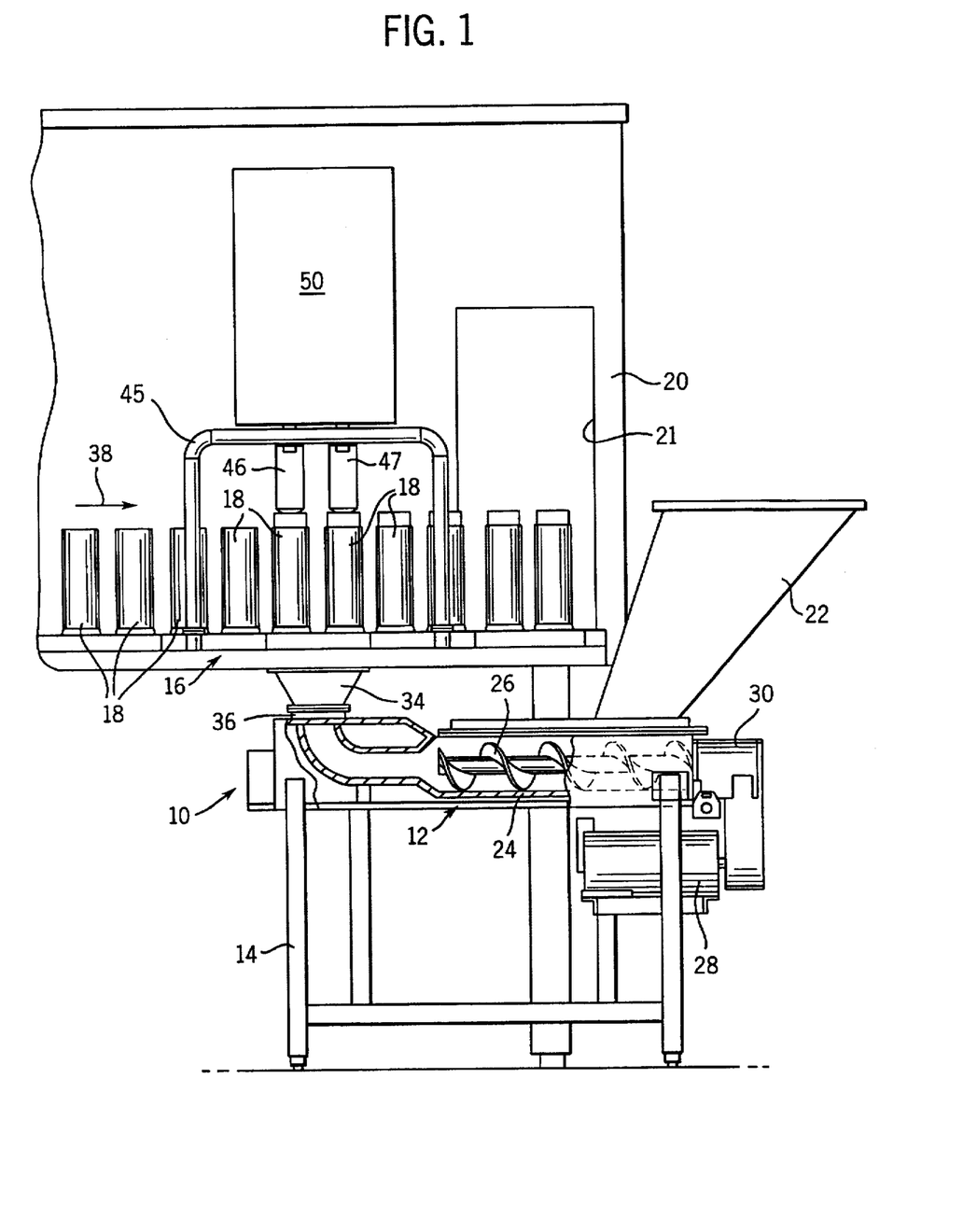
FIG. 1 is an elevational view of a cheese mold filling station according to the present invention.

With initial reference to FIG. 1, a cheese mold filling station 10 of the present invention includes an extruder 12 mounted on a frame 14 to deliver plastic fluid cheese to a molding line 16. A plurality of molds 18 are carried by the molding line 16 so that the molds can be filled with cheese as they pass over the extruder 12. The filled molds 18 then are conveyed from the filling station 10 into a conventional cooling chamber, or chiller, 20 to solidify the injected cheese. At the other end of the cooling chamber 20 is a standard mechanism (not shown) for removing the cheese from the molds 18 and the empty molds are returned to the filling station 10.

The extruder 12 includes a hopper 22 and a housing 24 to which the lower end of the hopper is mounted. Within the housing 24 is a rotating auger 26 which is driven by a variable speed electric motor 28 through a suitable transmission 30. The hopper 22 has an open top and is filled with heated cheese in a plastic state. For example, as is well known in the art, a separate mixer having a chamber with a warm water jacket may be used to knead cheese curd thereby cementing the curd into a cheese mass which flows as a warm plastic fluid into the hopper 22.

The warm plastic fluid cheese flows downward through the hopper into the housing 24 where it is carried along by the auger 26. Warm water may surround the housing 24 within the extruder 12 in order to maintain the cheese in a plastic fluidic state. The cheese is delivered from the housing 24 into a filler neck 34 which is rigidly connected to an outlet 36 of the housing 24.

Figure 2:
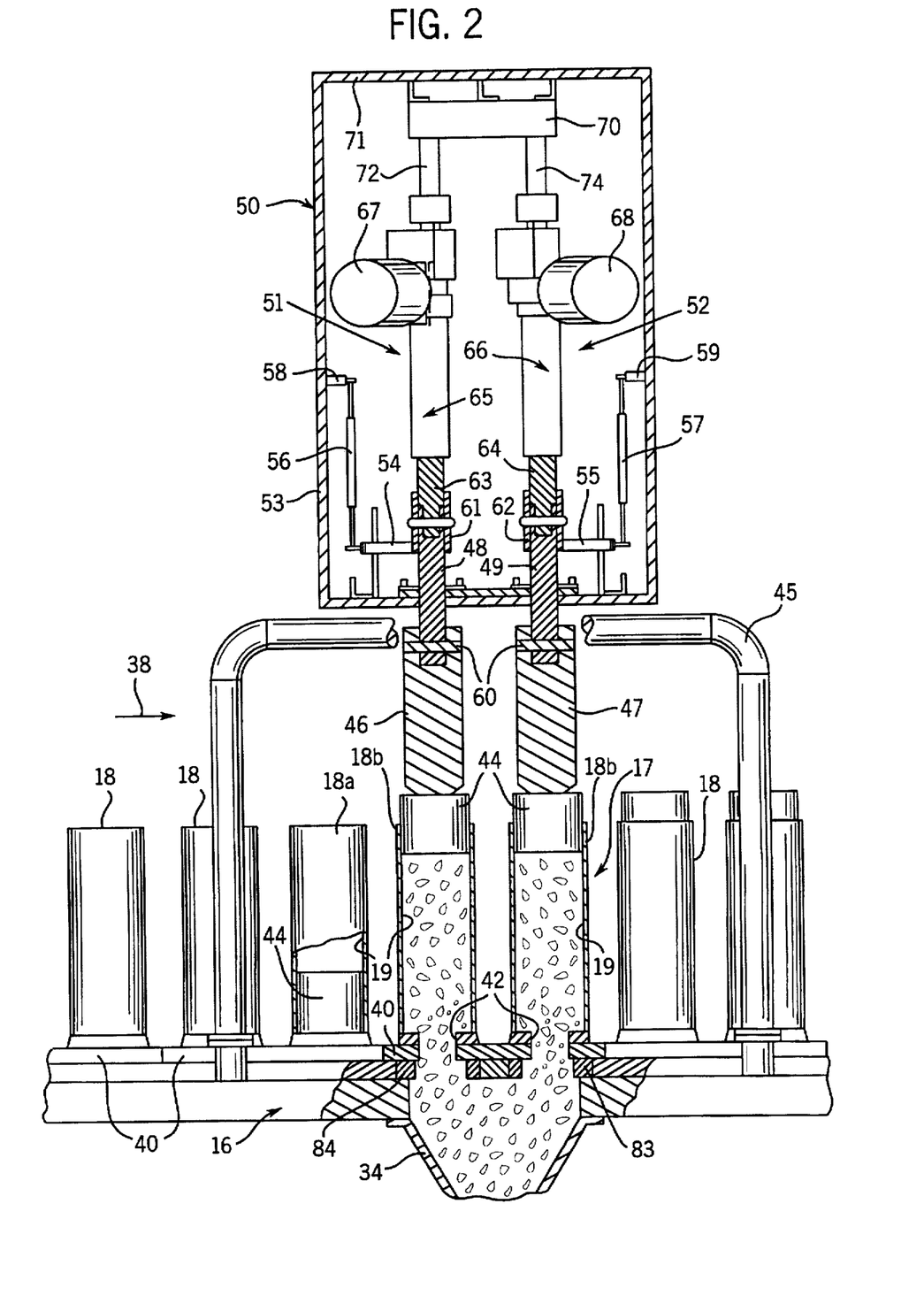
FIG. 2 is a partial cross-sectional view of the molds and mold fill sensing equipment in FIG. 1.

With reference to FIG. 2, the outlet of the filler neck 34 is connected to the underside of the molding line 16. The molding line 16 includes a conventional powered conveyor to transport the molds 18 horizontally in a direction indicated by arrow 38. The molds 18 are mounted in pairs on flat bases 40 with apertures 42 extending through the base and the bottom of the molds 18. When a mold assembly 17 is directly over the filler neck 34, cheese in the extruder 12 is forced upward from the filler neck 34 through the apertures 42 into the cavities 19 of hollow cheese molds 18b and 18c. Each of the molds 18 has a moveable cap 44 which prior to reaching the filler neck 34 is located at the bottom of the mold, as shown for mold 18a. The cap 44 is pushed upward as the molds 18b and 18c fill with cheese. Eventually the caps 44 of each mold 18 that is filling with cheese contacts a separate plunger 46 or 47 which is part of a fill regulator 50 located above the molding line 16.

Specifically, the fill regulator 50 is mounted on a tubular frame 45 that is attached to and rises above the molding line 16. Most of the components of fill regulator 50 are housed in an enclosure 53 mounted above the frame 45. The two plungers 46 and 47 are part of separate fill sensing mechanisms 51 and 52 which detect when the left and right molds 18b and 18c are properly filled. Left and right linear actuators 65 and 66, such as manufactured by Dayton Electric Manufacturing Co. of Chicago, Ill., enable the plungers 46 and 47 to be raised or lowered to accommodate different sizes of molds 18. Plungers 46 and 47 are removably attached on separate shafts 48 and 49 respectively, which pass through openings in the bottom plate of the enclosure 53. The shafts 48 and 49 extend into notches in the upper surfaces of the plungers and are held therein by removable pins 60. The other end of the shafts 48 and 49 are attached by sleeves 61 and 62 to the lead screws 63 and 64 respectively of the left and right linear actuators 65 and 66. The linear actuators have electric motors 67 and 68 which raise and lower the lead screws 63 and 64.

Figure 3:
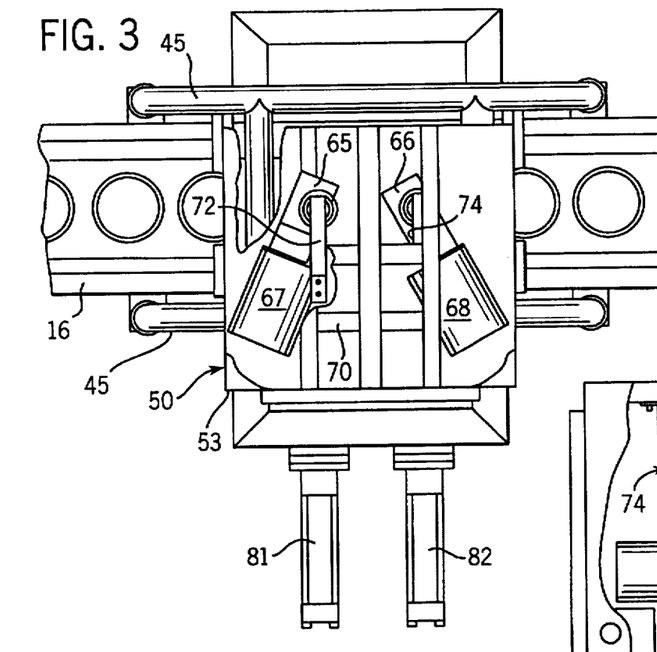
FIG. 3 is a top view of the cheese mold filling station with an upper cover cut away.
Figure 4:
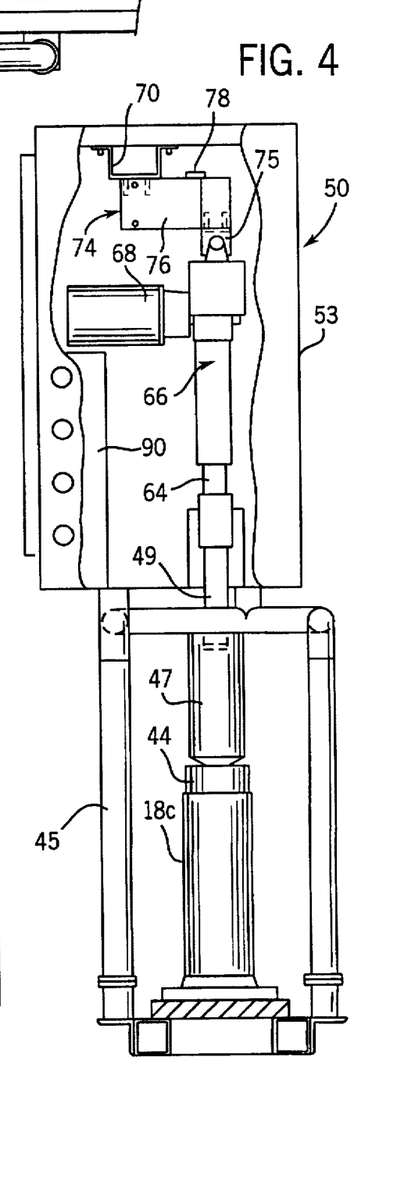
FIG. 4 is a partial cross-sectional side view of the mold filling station.

The left and right linear actuators 65 and 66 are suspended from a mounting bracket 70 attached to the interior of the upper plate 71 of the enclosure 53. Specifically a separate load cell 72 or 74, such as a model 60048 manufactured by Sensortronics of Covina, Calif., couple linear actuators 65 and 66, respectively, to the mounting bracket 70. As shown in FIGS. 3 and 4, each load cell 72 and 74 comprises a beam 76 which is cantilevered from one end to the mounting bracket 70 and the other end of the beam is attached by a fitting 75 to one linear actuator 65 or 66. Each beam 76 has a strain gage 78 thereon for sensing the bending force exerted on the beam by the linear actuator.

Figure 5A:
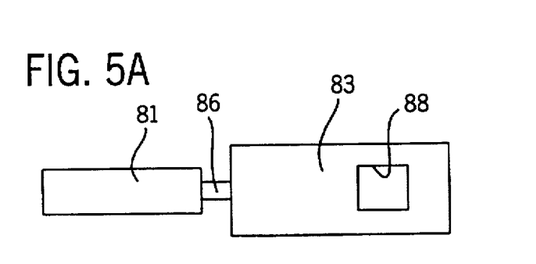
FIGS. 5A and 5B conceptually illustrate a cheese cutting knife at the bottom of the mold in two operating positions.
Figure 5B:
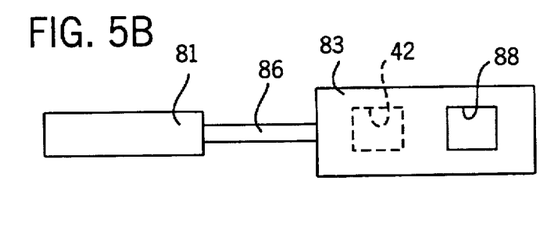

When the molds 18b and 18c have been filled with the proper amount of cheese, a given force is exerted upward through the plungers 46 and 47, shafts 48 and 49, and the linear actuator 65 and 66 onto the load cells 72 and 74. As will be described, an electronic controller 90 responds to the signals from the load cells 72 and 74 by activating solenoid valves for a pair of pneumatic cylinders 81 and 82 which respectively drive knife blades 83 and 84 beneath each mold 18b and 18c. FIGS. 5A and 5B illustrate two positions of a knife blade 83 which is connected to pneumatic cylinder 81 by piston shaft 86. Knife blade 83 is a rectangular plate with a square aperture 88 therethrough which is equal in size to the bottom aperture 42 in each mold 18. In the retracted position illustrated in FIG. 5A, the aperture 88 in the knife blade 83 is aligned with an aperture 42 in the mold thereby allowing cheese to flow upward from the filler neck 34 into the mold cavity 19. Once the load cell 74 indicates that the proper amount of cheese has been injected into the cavity of right mold 18c, pneumatic cylinder 81 is energized to extend the piston shaft 86 therefrom. This action drives the knife blade 83 horizontally across the outlet of the filler neck 34, into the paper in the orientation of the device in FIG. 2. At the end of the knife blade travel, a solid portion of the knife blade 83 extends across the entire aperture 42 in the bottom of the cheese mold 18c, as shown in FIG. 5B, acting as a gate which blocks further injection of cheese into the mold.

Referring again to FIG. 2, after each knife blade 83 and 84 has been activated to cut-off further injection of cheese into both molds 18b and 18c, the conveyor moves the newly filled molds horizontally along molding line 16 in the direction indicated by arrow 38. The full molds are moved toward the entrance 21 of the cooling chamber 20 and a new pair of empty molds are brought over the filler neck 34.

The pneumatic cylinders for the knife blades 83 and 84 and the electric motors 67 and 68 of the linear actuators 65 and 66 are controlled by controller 90 shown in detail in FIG. 5. The controller includes a conventional microcomputer 91 which includes input/output interface circuitry, read only memory (ROM) for program storage, and random access memory (RAM). Four manually operated switches 92–95 are connected to input lines of a parallel port of the microcomputer 91. Each of these input lines is normally held at a high logic level by a pull-up resistor (not shown). The four switches 92–95 when closed couple the respective input of the microcomputer 91 to ground, which is a low-logic level. Switch 92 is closed to signal the microcomputer to activate the left motor 87 to raise the left plunger 46 in FIG. 2. Similarly switch 93 is closed to produce a downward movement of the left plunger. Switches 94 and 95 are used to signal the microcomputer 91 to control right motor 68 to produce upward and downward movement of the right plunger 47.

The vertical positions of the plungers 46 and 47 are sensed by a pair of linear potentiometers 56 and 57, shown in FIG. 2. The first potentiometer 56 extends between a post 54 on the sleeve 61 of the left linear actuator 65 and a fixed post 58 attached to the inside surface of the enclosure 53. The second potentiometer 57 extends from another post 55 on the sleeve 62 of right linear actuator 66 to another fixed post 59 on the inside of enclosure 53. When the linear actuators 65 and 66 move the plungers 46 and 47 up and down, the resistance of the potentiometers 56 and 57 change, thereby producing an electrical signal having a voltage indicative of the vertical position of the associated plunger.

Figure 6:
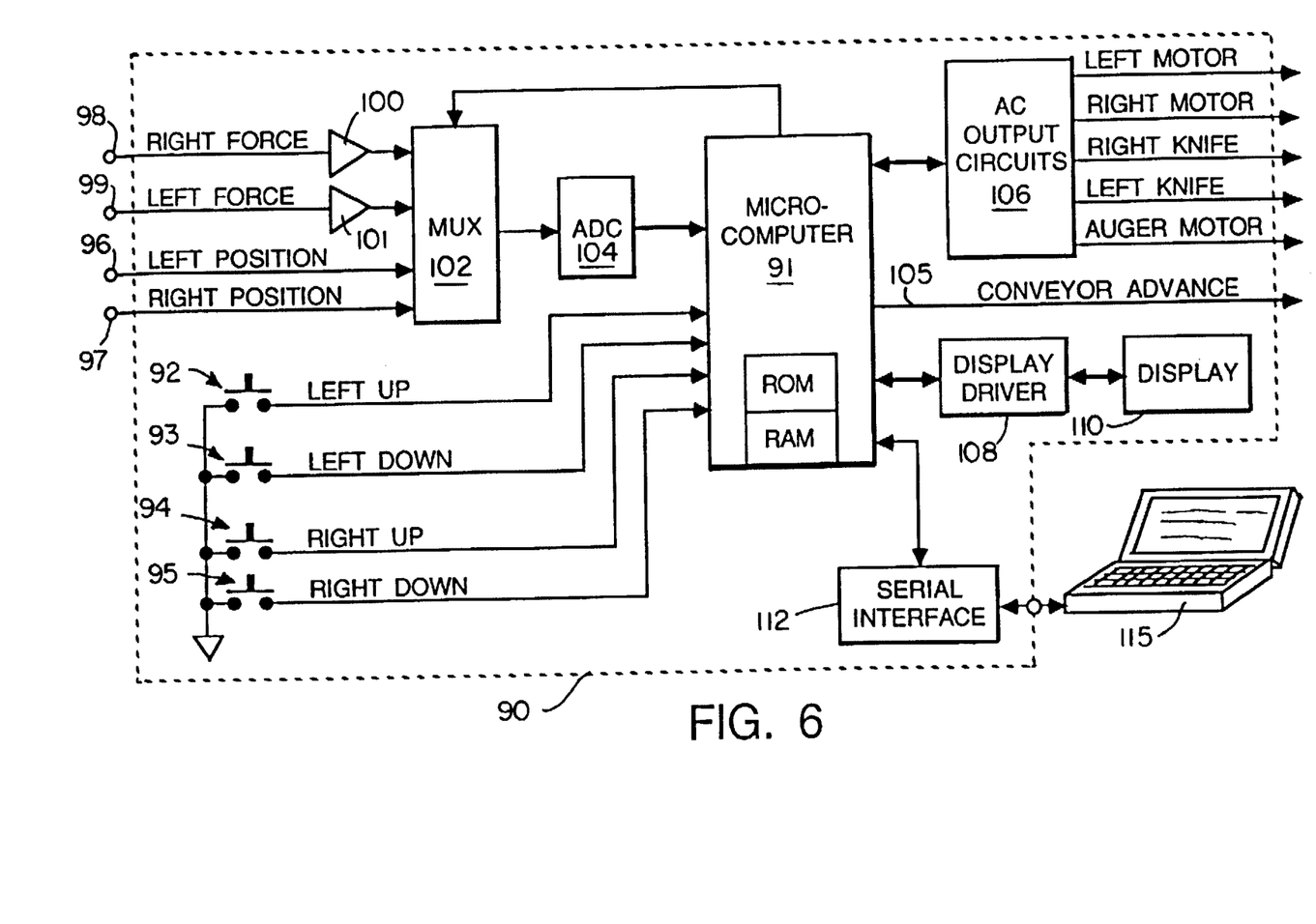
FIG. 6 is a block schematic diagram of the computer control circuit for the mold filling station.

Signals from the vertical position sensing potentiometers 56 and 57 are applied via lines 96 and 97 to separate inputs of a four-to-one multiplexer (MUX) 102 in FIG. 6. The force signals produced by the load cells 72 and 74 are applied via lines 98 and 99 and amplifiers 100 and 101 to other inputs of multiplexer 102. In response to a selection signal produced by the microcomputer 91, one of the inputs of the multiplexer 102 is connected to an output which is coupled to the input of an analog-to-digital converter (ADC) 104. The analog signal from the multiplexer is digitized and applied to a parallel input of the microcomputer 91.

As will be described, the microcomputer 91 executes a control program stored in the ROM which controls the operation of the cheese mold filling station 10. In response to the execution of various instructions, output signals are produced for controlling devices on the system. A series of output signals are sent by the microcomputer 91 to a set of 120 volt AC output circuits 106 which produce signals for operating the left and right motors 67 and 68 and solenoid valves which supply air to pneumatic cylinders 81 and 82 that operate the knife blades 83. In addition, the microcomputer 91 sends information to a display driver 108 for presentation on an alphanumeric display 110 to the operator of the cheese mold filling station 10. Such information includes the force applied by the molds to the load cells, the position of plungers 46 and 47, and other information utilized in controlling the mold filling station. Alternatively, meters may be employer to display the force and position information to an operator. The microcomputer 91 also is connected to a serial interface 112 for the exchange of data with a central computer system or a personal computer 115 that is connected to configure the control system.

The control program executed by the microcomputer 91 is transferred into the ROM from the personal computer 115 which is connected temporarily to the serial interface 112. At that time, default values for the force thresholds of the left and right mold fill sensing mechanisms 51 and 52 are stored in other locations within the memory of the microcomputer. The personal computer 115 also is utilized to provide zero offset values and gain factors for both the position sensing potentiometers 56 and 57 and the load cells 72 and 74, as will be described.

Figure 7A:
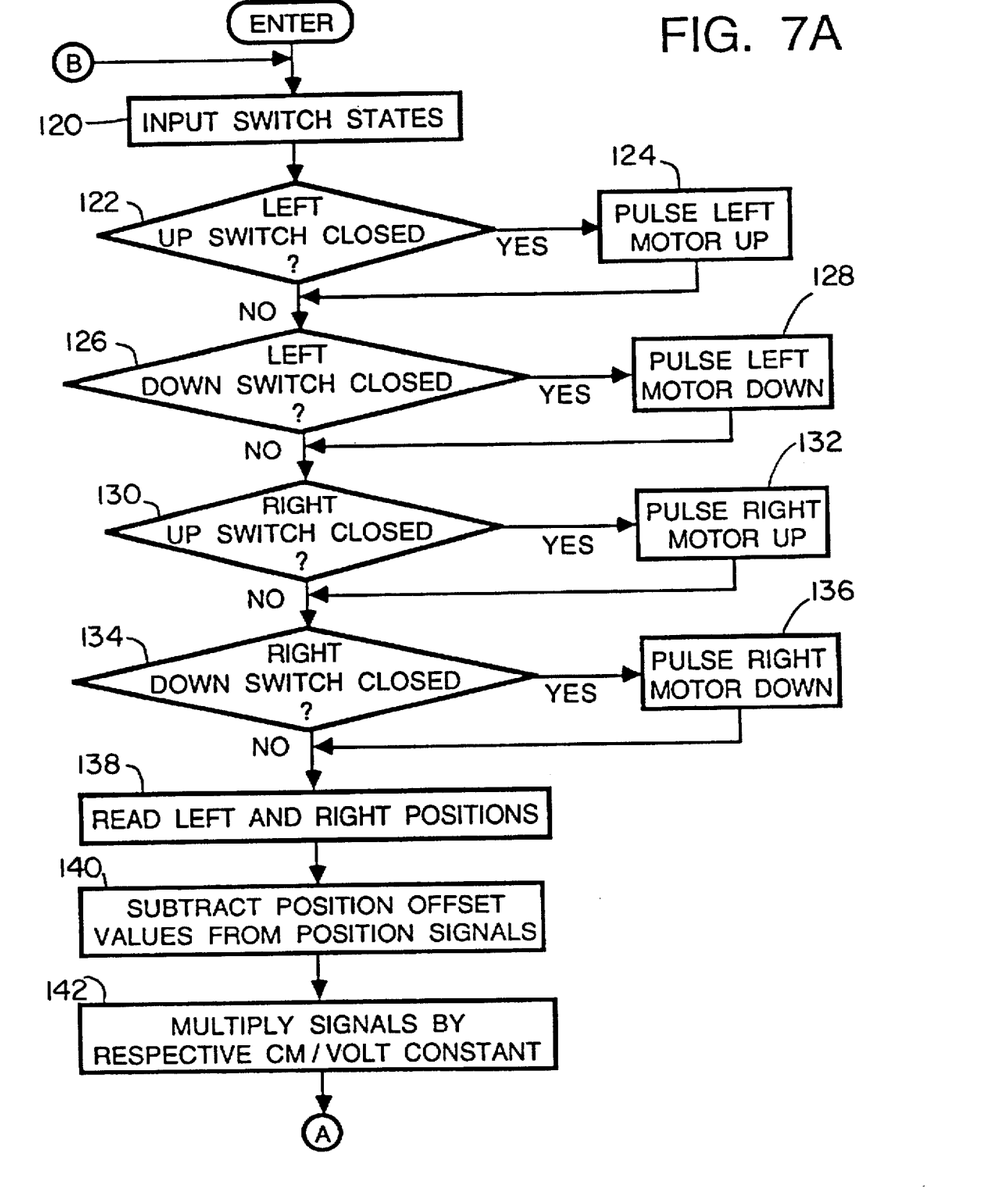
FIGS. 7A and 7B are a flowchart of the computer program which is executed by the computer control circuit to operate the mold filling station.

The execution of the control program is depicted by the flowchart in FIG. 7A. The program commences by detecting whether the operator is activating one of the switches 92-95 in order to adjust the height of the fill sensing mechanisms 51 and 52. Specifically at step 120 the microcomputer 91 reads an input port in order to obtain the states of the operator switches 92-95. The program advances to step 122 where a determination is made whether the left up switch 92 is closed. If that is the case, the microcomputer sends a control signal to the AC output circuit 106 for the left motor 67 which produces a ten millisecond output pulse that causes the left motor to be energized briefly to turn the lead screw 63 upward. The left motor 67 is pulsed each time step 124 is executed. At step 126 a determination is made whether the operator is activating the left down switch 93 in which case the left motor 67 is activated by the AC output circuits 106 for ten milliseconds to turn the lead screw 63 in the downward direction. Then the program execution advances to a section comprising steps 130, 132, 134 and 136 which similarly test the up and down switches 94 and 95 for the right motor 68 on linear actuator 66. Closure of either of these switches 94 and 95 produces an up or down pulsation of the right motor in a similar manner to that previously described with respect to the left motor 67.

After the left and right motor control switches 92-95 have been checked and the motors activated accordingly, the signals from the position sensing potentiometers 56 and 57 are sensed at step 138 to determine the present positions of plungers 46 and 47. Specifically the microcomputer 91 sends signals to the multiplexer 102 to sequentially select the signals on the lines 96 and 97 from the respective left and right potentiometers 56 and 57 to be applied to the input of analog-to-digital converter 104. Thus the respective voltage levels produced by the two potentiometers 56 and 53 are inputted into the microcomputer 91 and stored temporarily in its memory as raw position data.

In order to measure the position of the plungers 46 and 47 from the respective potentiometer signals, an offset value corresponding to the output of the respective potentiometer at an arbitrary zero reference position must be subtracted from the raw position data at step 140. In addition, a gain factor relating the voltage level to units of distance, such as centimeters, must be applied at step 142 in order to determine the distance that the respective plungers 46 and 47 are from the zero reference positions.

These signal processing parameters are set during configuration of the controller 90 when the personal computer 115 is connected to the serial interface 112. Each mold fill sensing mechanism 51 and 52 is configured separately by an identical process and the procedure for left mechanism 51 will be described in detail. First, the left motor 67 is operated until left plunger 46 is located at a zero reference position, as determined for example by a manual measurement of the distance from the mold base 40. At this time microcomputer 91 is executing the control program and displaying the positions indicated by potentiometers 56 and 57 on display 110. The operator employs personal computer 115 to send a new position offset value to the controller microcomputer 91 where the values are stored and used to compute the position of the left plunger. When the offset value is changed, the position indicated by the display 110 also changes as the new offset value is subtracted from the incoming position signal at step 140. The left offset value continues to be changed until a position of zero centimeters is displayed, at which point the position offset value for left fill sensing mechanism 51 has been calibrated properly. That value remains stored in the memory of microcomputer 91 for use in subsequent positioning of the plungers.

The next configuration procedure determines the position gain factor representing the relationship between the left potentiometer signal voltage and the position of the left plunger 46 in centimeters, i.e. a cm/volt constant. To do so, the left plunger 46 is moved to another known position near the upper extreme of its travel. From the potentiometer output at this calibration position and the distance of the other known position from the zero reference position, the gain factor for the left fill sensing mechanism 51 is determined in a conventional manner and stored in another location in the microcomputer memory.

During execution of the control program, the position offset values for the fill sensing mechanisms 51 and 52 are subtracted from the respective left and right position signals and the resultant values are multiplied by the cm/volt gain factor at step 142. The results of these calculations are the positions of the respective plungers 46 and 47 in centimeters from the arbitrary zero reference position.

The plungers 46 and 47 of different heights can be attached to the shafts 48 and 49 in order to cooperate with different size molds. Typically the bottom surfaces of the plungers 46 and 47 are positioned between one and two centimeters above the upper surface of an empty mold, i.e. a mold with an end cap 44 located entirely within the mold cavity 19. The operator can manually operate motors 67 and 68 to adjust the plungers 46 and 47 up and down to fine tune the operation of the system. Once the plungers 46 and 47 have been properly positioned for a particular mold size the linear actuators 65 and 66 remain fixed during the filling operation.

Figure 7B:
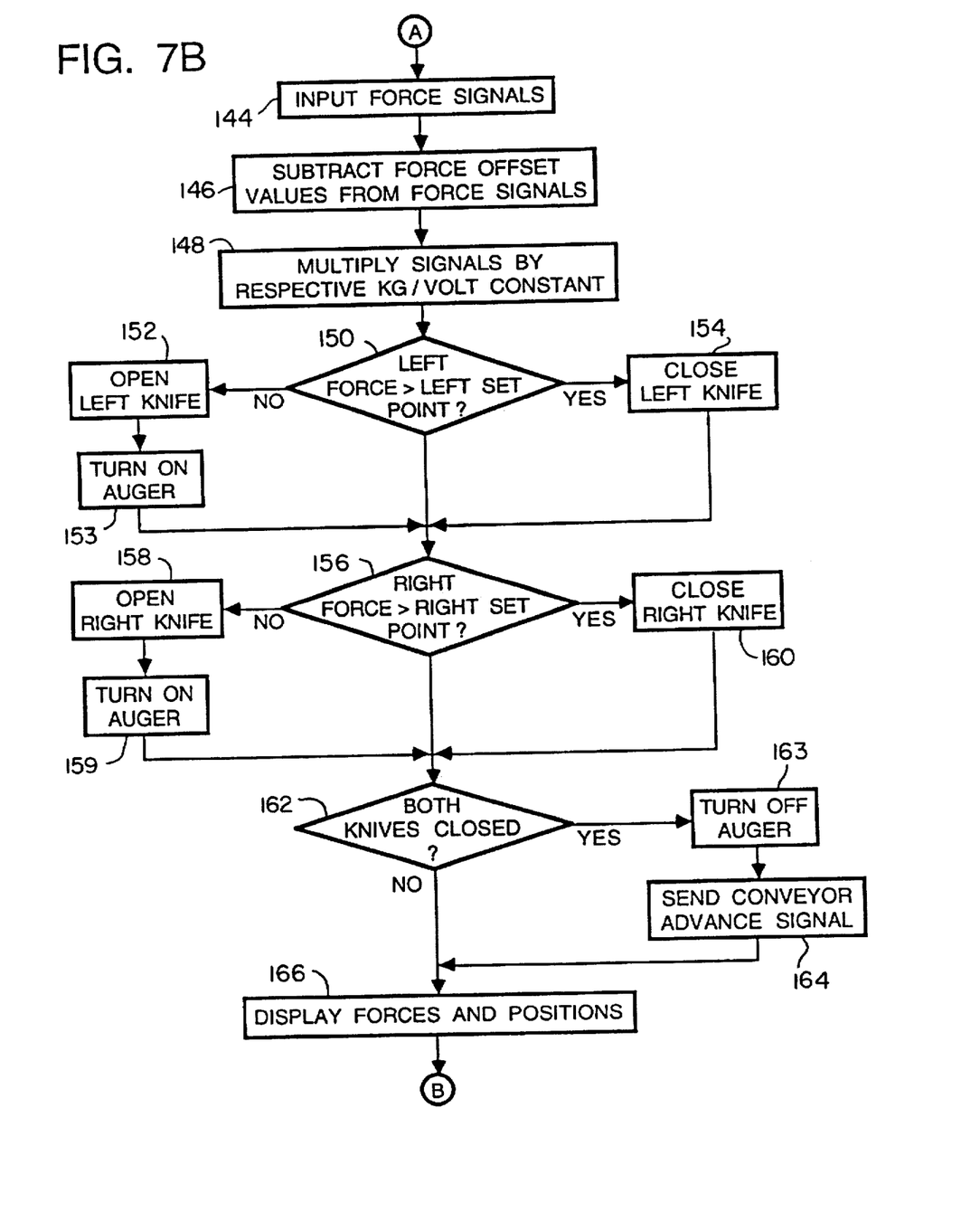

The execution of the control program then advances to a portion depicted in FIG. 7B where the force signals from the load cells 72 and 74 are digitized and processed to determine whether the molds 18b and 18c have been properly filled with cheese. At step 144 the microcomputer 91 sends selection signals to multiplexer 102 causing the right and left load cell force signals on lines 98 and 99 to be connected sequentially to the input of the analog to digital converter 104. Thus the analog to digital converter 104 converts the load cell signals into a pair of digital raw force values which are stored within the memory of the microcomputer 91. Then at step 146, the force offset values for each load cell are subtracted from the respective raw force value, and at step 148 the results are multiplied by the corresponding gain value to express the data in terms of units of force (e.g., kilograms).

The separate force offset values and gain factors for each load cell 72 and 74 are determined during the configuration process. The force offset value for the left fill sensing mechanism 51 is determined by sensing the signal from load cell 72 when no force, other than gravity, is being exerted on the plunger 46. The load cell signal is processed by microcomputer 91 according to the program in FIG. 7B and the corresponding force in kilograms is presented to the operator on display 110. If necessary, the operator enters commands in the personal computer 115 to vary the left force offset value utilized by the microcomputer 91 until the display reads zero kilograms.

To set the gain factor for the left load cell 72, a weight scale is placed beneath the plunger 46 and the motor 67 is operated until the plunger contacts the scale and exerts a predefined amount of force, for example 100 kilograms, as indicated by the scale. If the system is properly calibrated, the force for the left fill sensing mechanism 51 as shown on display 110 should read the same as on the scale (e.g. 100 kilograms). If that is not the case, the operator enters commands into the personal computer 115 to vary the left load cell gain factor that is stored in the microcomputer 91 until the force shown on the display 110 corresponds to that indicated by the scale. At that time both the load cell force offset value and the gain factor for the left fill sensing mechanism 51 are properly calibrated. The calibration process then is repeated for the right fill sensing mechanism 52.

Thus each time the control program loops through steps 144–148 during a mold filling operation, the force offset values are subtracted from the digitized load cell force signals and then each resultant value is multiplied by the respective load cell gain factor which is a constant that relates the signal voltage to kilograms of force.

As cheese is forced into the bottom of the molds 18b and 18c, as shown in FIG. 2, the plastic caps 44 rise to the upper end of the mold cavities 19. Eventually the caps 44 contact the associated plunger 46 and 47 and begin exerting an upward force thereon which is measured by the corresponding load cells 72 and 74. The sensed forces are compared to separate set points for each fill sensing mechanism 51 and 52. When the force exceeds the set point (e.g. 20 kg), the system knows that the corresponding mold has been filled with cheese to the proper density.

The force set points also are determined during the calibration procedure by filling molds, and then having the operator remove and weigh the cheese. The operator adjusts the set points via the personal computer 115 until molded cheese having the proper weight is produced from each mold 18b and 18c. Alternatively, an automatic weighing system could be incorporated at the output of the extruder 12 to periodically, such as at the start of each work shift, weigh filled molds to determine the amount of cheese. The automatic system then would alter the corresponding set point until the cheese in the mold has the desired weight.

Once the plunger forces have been determined at step 148 when the mold filling station 10 is filling molds, the left force from load cell 72 is compared by microcomputer 91 to the left set point at step 150. If that force is below the set point, the program execution branches to step 152 where a signal is sent by the microcomputer to the AC output circuit 106. The AC output circuit responds by producing an output signal for the left knife blade 84 which operates a solenoid valve to cause the actuator 82 to place the knife blade in the open position (see FIG. 5A). At step 153, another signal is sent to the AC output circuit 106 by the microcomputer 91 to turn on the motor 28 which drives the extruder auger 26. When the left force is found to be greater than the associated set point the program execution branches from step 150 to step 154 where a signal is sent to the AC output circuit 106 which causes the associated actuator 82 to close the left knife blade 84 (see FIG. 5B) thereby cutting off further flow of cheese into the associated mold 18b. Similarly at step 156 the force from the right load cell 74 is compared to a separate set point for the right fill sensing mechanism 52 to produce signals from the AC output circuit 106 which open and close the right knife blade 84 at steps 158 and 160, respectively, and turn on auger motor 28 at step 159.

The program execution then advances to step 162 where a determination is made whether both of the knife blades 83 and 84 are in the closed state which occurs when both molds 18b and 18c have been properly filled with cheese. When this condition exists, the microcomputer 91 signals the AC output circuits 106 to turn off the auger motor 28 at step 163. At the same time, a signal is transmitted on output line 105 by the microcomputer 91 at step 164 which signals another controller for the conveyor of molding line 16 to advance the molds 18 so as to bring a new pair of molds over the filler neck 34.

As the filled molds 18b and 18c move from underneath the plungers 46 and 47, the forces sensed by load cells 72 and 74 drop below the force set points. This causes the knife blades 83 and 84 to be retracted into the open position on the next execution of steps 150 and 156. The mold base 40 blocks the flow of cheese until the apertures 42 for the next pair of molds are above the filler neck 34 as shown in FIG. 2.

At step 166 the forces and the positions of the left and right fill sensing mechanisms 51 and 52 are sent to the display driver 108 to present that information on display 110. The control program execution then returns to step 120 to repeat the process.

I claim:

1. An apparatus for filling a mold with cheese, wherein the mold has an opening and a moveable wall; said apparatus comprising:
    a filling device which injects cheese through the opening into the mold;
    a sensor to measure force exerted by the cheese against the moveable wall;
    a mechanism which stops injection of cheese from the filling device into the mold in response to a control signal; and
    a controller connected to the sensor to generate the control signal when the force measured by the sensor reaches a predetermined level.

2. The apparatus as recited in claim 1 wherein said mechanism comprises a knife blade movably positioned adjacent the opening to alternately permit and block cheese flowing into the mold.

3. The apparatus as recited in claim 1 wherein said filling device has a motor and said mechanism turns off the motor.

4. The apparatus as recited in claim 1 wherein said filling device comprises an extruder which injects cheese into the mold.

5. The apparatus recited in claim 1 further comprising a display connected to the controller to indicate the force being measured by said sensor.

6. The apparatus recited in claim 1 further comprising frame member; and wherein said sensor comprises a load cell coupling said plunger to the frame member.

7. The apparatus recited in claim 1 wherein said controller comprises an analog to digital converter which converts the signal from said sensor into a digital value; and a microcomputer which has an input port connected to the analog to digital converter.

8. The apparatus as recited in claim 1 wherein said sensor produces an output signal indicating the force; and said controller comprises a subtractor which subtracts an offset value from the signal produced by said sensor to derive an intermediate signal, and a multiplier which multiples the intermediate signal by a gain factor.

9. An apparatus for filling a mold with cheese, wherein the mold has an opening and a moveable wall, said apparatus comprising:

an extruder to inject cheese through the opening into the mold;

a plunger located at a position adjacent to the mold so as to be contacted by the moveable wall as the mold fills with cheese;

an actuator for varying the position of the plunger;

a sensor coupled to the plunger to measure force exerted by the cheese against the moveable wall;

a gate which is moveable between a first position in which cheese can flow from the extruder into the mold and a second position in which the gate blocks cheese from flowing from the extruder into the mold;

a driver for moving said gate between the first and second positions in response to a control signal; and a controller connected to the sensor to generate the control signal when the force reaches a predetermined level.

10. The apparatus as recited in claim 9 further comprising an actuator for changing a location of the plunger to accommodate molds of different sizes.

11. The apparatus as recited in claim 10 wherein said actuator comprises a linear actuator having a motor which drives a lead screw that is attached to said plunger.

12. The apparatus as recited in claim 11 wherein said sensor comprises a load cell which couples said linear actuator to a support.

13. The apparatus as recited in claim 12 further comprising position sensor to measure the location of the plunger; and a display device connected to the position sensor to display the location to an operator of the apparatus.

14. A method producing cheese products using a mold which has an opening and a moveable wall, said method comprises steps of:

injecting cheese from a filling device through the opening into the mold;

using a sensor to measure force exerted by the cheese against the moveable wall;

employing a mechanism to stop injection of cheese from the filling device into the mold in response to a control signal; and generating the control signal with a controller when the force measured by the sensor reaches a predetermined level.

* * * * *